United States Patent
Nekhamkin et al.

(10) Patent No.: US 9,819,480 B2
(45) Date of Patent: Nov. 14, 2017

(54) SYSTEM AND METHOD FOR SYNCHRONOUS PROCESSING OF ANALOG AND DIGITAL PATHWAYS IN A DIGITAL RADIO RECEIVER

(71) Applicant: iBiquity Digital Corporation, Columbia, MD (US)

(72) Inventors: Michael Nekhamkin, Bridgewater, NJ (US); Hangjun Chen, Livingston, NJ (US); Linlin Li, Morganville, NJ (US)

(73) Assignee: Ibiquity Digital Corporation, Columbia, MD (US)

( * ) Notice: Subject to any disclaimer, the term of this patent is extended or adjusted under 35 U.S.C. 154(b) by 104 days.

(21) Appl. No.: 14/817,578

(22) Filed: Aug. 4, 2015

(65) Prior Publication Data

US 2017/0041129 A1 Feb. 9, 2017

(51) Int. Cl.
*H04L 7/00* (2006.01)
*H04W 56/00* (2009.01)
(Continued)

(52) U.S. Cl.
CPC ............ *H04L 7/0041* (2013.01); *H04B 1/16* (2013.01); *H04H 20/30* (2013.01); *H04H 40/18* (2013.01); *H04H 60/11* (2013.01); *H04L 7/0079* (2013.01); *H04L 12/18* (2013.01); *H04W 56/005* (2013.01); *H04H 2201/18* (2013.01);
(Continued)

(58) Field of Classification Search
CPC ........... H04H 2201/12; H04H 2201/18; H04H 2201/19; H04H 2201/20; H04H 40/18; H04H 20/30; H04W 56/005; H04L 7/0029; H04L 7/0041; H04L 27/2662; H04L 7/0079; H04L 27/2647; H04L 12/18; H04B 1/16
See application file for complete search history.

(56) References Cited

U.S. PATENT DOCUMENTS 6,178,317 B1   1/2001   Kroeger et al.
6,539,065 B1 *  3/2003   Furukawa ............... H04H 40/18
                                                            375/259

(Continued)

OTHER PUBLICATIONS

"In-Band/On-Channel Digital Radio Broadcasting Standard", NRSC-5-C, National Radio Systems Committee, Washington, DC, Sep. 2011.

(Continued)

*Primary Examiner* — Sophia Vlahos
(74) *Attorney, Agent, or Firm* — Schwegman Lundberg & Woessner, P.A.

(57) ABSTRACT

A method of processing a digital radio broadcast signal in a digital radio receiver includes: receiving baseband signal samples at a first sample rate; adjusting the sample rate of the baseband signals based on a difference between a receiver clock and a transmitter clock to produce adjusted baseband signal samples at a second sample rate; filtering the adjusted baseband signal samples to separate a digital component of the samples and an analog component of the samples, wherein the digital component and the analog component are synchronous; and separately demodulating the digital component and the analog component to produce a digital output signal and an analog output signal. A receiver that uses the method is also provided.

15 Claims, 8 Drawing Sheets

(51) Int. Cl.
*H04H 20/30* (2008.01)
*H04H 40/18* (2008.01)
*H04H 60/11* (2008.01)
*H04B 1/16* (2006.01)
*H04L 12/18* (2006.01)
*H04L 27/26* (2006.01)

(52) U.S. Cl.
CPC ........ *H04L 7/0029* (2013.01); *H04L 27/2647* (2013.01); *H04L 27/2662* (2013.01)

(56) References Cited

U.S. PATENT DOCUMENTS

| | | | |
|---|---|---|---|
| 6,590,944 B1 | 7/2003 | Kroeger | |
| 6,671,340 B1 | 12/2003 | Kroeger et al. | |
| 6,721,337 B1 | 4/2004 | Kroeger et al. | |
| 6,735,257 B2 | 5/2004 | Kroeger | |
| 6,898,249 B2 | 5/2005 | Kroeger et al. | |
| 6,901,242 B2 | 5/2005 | Kroeger et al. | |
| 6,982,948 B2 | 1/2006 | Kroeger et al. | |
| 7,305,043 B2 | 12/2007 | Milbar et al. | |
| 7,546,088 B2 | 6/2009 | Kroeger et al. | |
| 7,733,983 B2 | 6/2010 | Kroeger et al. | |
| 8,027,419 B2 | 9/2011 | Iannuzzelli et al. | |
| 8,040,989 B2 | 10/2011 | Nekhamkin et al. | |
| 8,068,563 B2 | 11/2011 | Nekhamkin et al. | |
| 8,144,612 B2 | 3/2012 | Johnson et al. | |
| 8,180,470 B2 | 5/2012 | Pahuja | |
| 8,451,868 B2 | 5/2013 | Johnson et al. | |
| 8,660,128 B2 | 2/2014 | Iannuzzelli et al. | |
| 8,737,532 B2* | 5/2014 | Green | H04L 25/0262 375/256 |
| 8,804,037 B2 | 8/2014 | Johnson et al. | |
| 8,804,865 B2 | 8/2014 | Elenes et al. | |
| 8,808,865 B2* | 8/2014 | Kondo | H01L 24/26 428/413 |
| 2007/0086533 A1* | 4/2007 | Lindh | H04L 27/0014 375/260 |
| 2007/0110185 A1 | 5/2007 | Kroeger et al. | |
| 2008/0181144 A1* | 7/2008 | Rofougaran | H03H 7/40 370/297 |
| 2008/0279090 A1* | 11/2008 | Liu | H04L 27/0008 370/210 |
| 2008/0292027 A1* | 11/2008 | Liu | H04B 1/0003 375/340 |
| 2009/0190701 A1 | 7/2009 | Nekhamkin et al. | |
| 2012/0108191 A1* | 5/2012 | Henson | H04W 52/0229 455/160.1 |
| 2013/0343547 A1 | 12/2013 | Pahuja et al. | |
| 2013/0343576 A1 | 12/2013 | Pahuja | |

OTHER PUBLICATIONS

National Radio Systems Committee, "NRSC-5-C In-band/on-channel Digital Radio Broadcasting Standard", Sep. 2011.

* cited by examiner

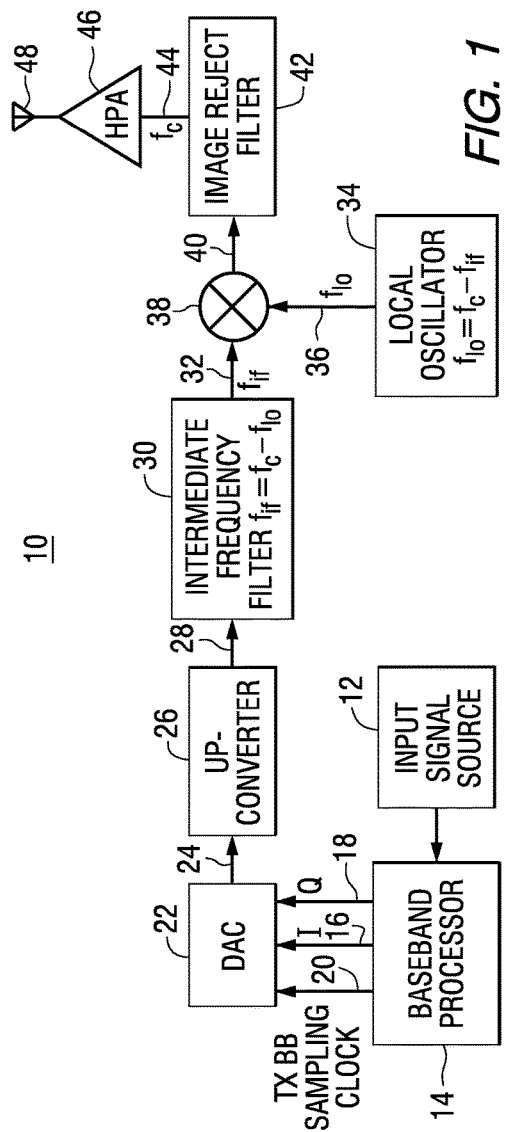
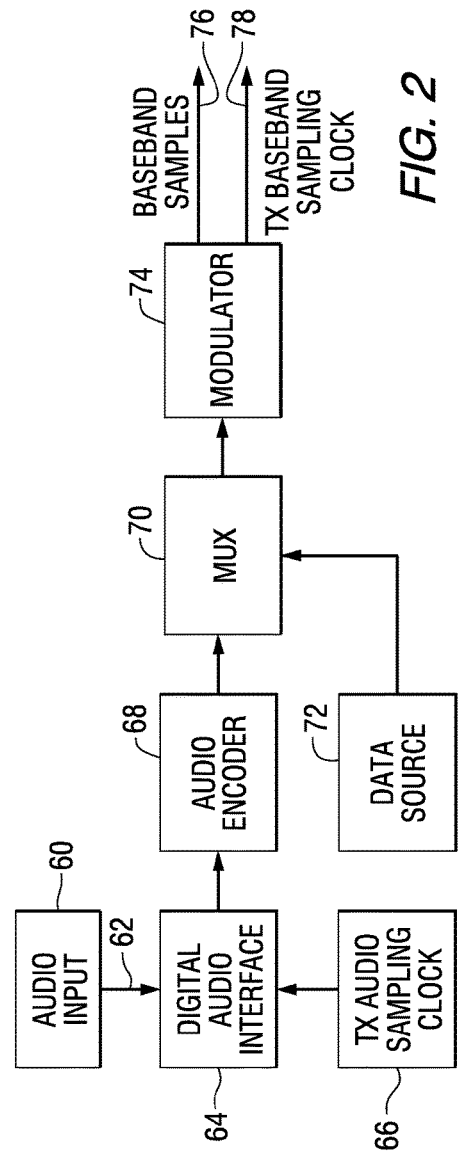
FIG. 1
FIG. 2

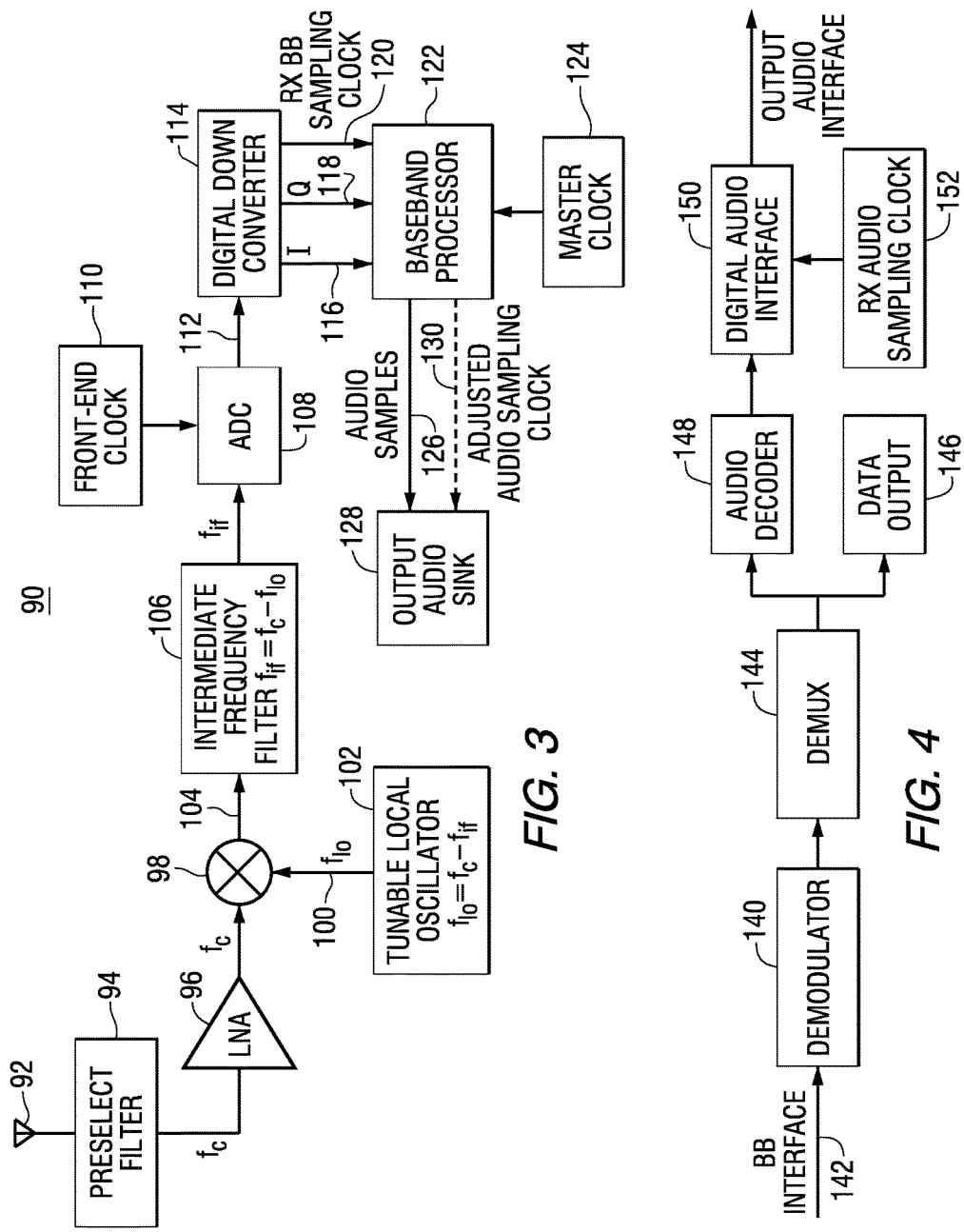

*FIG. 6* *PRIOR ART*

SYSTEM AND METHOD FOR SYNCHRONOUS PROCESSING OF ANALOG AND DIGITAL PATHWAYS IN A DIGITAL RADIO RECEIVER

FIELD OF THE DISCLOSURE

The present disclosure relates to digital radio broadcast receivers and, in particular, to methods and systems for synchronous processing of analog and digital pathways in digital radio receivers.

BACKGROUND INFORMATION

Digital radio broadcasting technology delivers digital audio and data services to mobile, portable, and fixed receivers. One type of digital radio broadcasting, referred to as in-band on-channel (IBOC) digital audio broadcasting (DAB), uses terrestrial transmitters in the existing Medium Frequency (MF) and Very High Frequency (VHF) radio bands. HD Radio™ technology, developed by iBiquity Digital Corporation, is one example of an IBOC implementation for digital radio broadcasting and reception.

IBOC signals can be transmitted in a hybrid format including an analog modulated carrier in combination with a plurality of digitally modulated carriers or in an all-digital format wherein the analog modulated carrier is not used. Using the hybrid mode, broadcasters may continue to transmit analog AM and FM simultaneously with higher-quality and more robust digital signals, allowing themselves and their listeners to convert from analog-to-digital radio while maintaining their current frequency allocations.

One feature of digital transmission systems is the inherent ability to simultaneously transmit both digitized audio and data. Thus the technology also allows for wireless data services from AM and FM radio stations. The broadcast signals can include metadata, such as the artist, song title, or station call letters. Special messages about events, traffic, and weather can also be included. For example, traffic information, weather forecasts, news, and sports scores can all be scrolled across a radio receiver's display while the user listens to a radio station.

IBOC technology can provide digital quality audio, superior to existing analog broadcasting formats. Because each IBOC signal is transmitted within the spectral mask of an existing AM or FM channel allocation, it requires no new spectral allocations. IBOC promotes economy of spectrum while enabling broadcasters to supply digital quality audio to the present base of listeners.

Multicasting, the ability to deliver several audio programs or streams over one channel in the AM or FM spectrum, enables stations to broadcast multiple streams on separate supplemental or sub-channels of the main frequency. For example, multiple streams of data can include alternative music formats, local traffic, weather, news, and sports. The supplemental channels can be accessed in the same manner as the traditional station frequency using tuning or seeking functions. For example, if the analog modulated signal is centered at 94.1 MHz, the same broadcast in IBOC can include supplemental channels 94.1-1, 94.1-2, and 94.1-3. Highly specialized programming on supplemental channels can be delivered to tightly targeted audiences, creating more opportunities for advertisers to integrate their brand with program content. As used herein, multicasting includes the transmission of one or more programs in a single digital radio broadcasting channel or on a single digital radio broadcasting signal. Multicast content over IBOC transmissions can include a main program service (MPS); supplemental program services (SPS), program service data (PSD), and/or other broadcast data.

The National Radio Systems Committee, a standard-setting organization sponsored by the National Association of Broadcasters and the Consumer Electronics Association, adopted an IBOC standard, designated NRSC-5A, in September 2005. NRSC-5, the disclosure of which is incorporated herein by reference, sets forth the requirements for broadcasting digital audio and ancillary data over AM and FM broadcast channels. The standard and its reference documents contain detailed explanations of the RF/transmission subsystem and the transport and service multiplex subsystems. Copies of the standard can be obtained from the NRSC at http://www.nrscstandards.org/standards.asp. iBiquity's HD Radio technology is an implementation of the NRSC-5 IBOC standard. Further information regarding HD Radio technology can be found at www.hdradio.com and www.ibiquity.com.

Other types of digital radio broadcasting systems include satellite systems such as Satellite Digital Audio Radio Service (SDARS, e.g., XM Radio™, Sirius®), Digital Audio Radio Service (DARS, e.g., WorldSpace®), and terrestrial systems such as Digital Radio Mondiale (DRM), Eureka 147 (branded as DAB Digital Audio Broadcasting®), DAB Version 2, and FMeXtra®. As used herein, the phrase "digital radio broadcasting" encompasses digital audio and data broadcasting including in-band on-channel broadcasting, as well as other digital terrestrial broadcasting and satellite broadcasting.

Digital radio broadcasting systems use a variety of audio encoding/decoding techniques. These techniques typically require synchronization between clocks in the digital radio transmitter and receiver to match the audio sampling rates. Previously, in such systems, the analog and digital pathways are separately, and thus asynchronously, processed. In a software implementation, for example, analog and digital demodulation processes are treated as separate tasks using different software threads. This separation requires additional task scheduling and context switching, which may increase implementation complexity and required MIPS (million instructions per second). In addition, this separation may complicate the processing required to time align the analog and digital signals for purposes of blending. Thus, in certain systems there is a need to adjust the audio sample rate in a manner that permits synchronously processing the analog and digital components of the digital radio broadcast signal.

SUMMARY

According to an exemplary embodiment, a method of processing a digital radio broadcast signal in a digital radio receiver comprises: receiving baseband signal samples at a first sample rate; adjusting the sample rate of the baseband signals based on a difference between a receiver clock and a transmitter clock to produce adjusted baseband signal samples at a second sample rate; filtering the adjusted baseband signal samples to separate a digital component of the samples from an analog component of the samples, wherein the digital component and the analog component are synchronous; and separately demodulating the digital component and the analog component to produce a digital output signal and an analog output signal.

In another embodiment, a receiver for processing a digital radio broadcast signal comprises: a processing system configured to receive baseband signal samples at a first sample rate; adjust the sample rate of the baseband signals based on a difference between a receiver clock and a transmitter clock to produce adjusted baseband signal samples at a second sample rate; filter the adjusted baseband signal samples to separate a digital component of the samples and an analog component of the samples, wherein the digital component and the analog component are synchronous; and separately demodulate the digital component and the analog component to produce a digital output signal and an analog output signal.

In another embodiment, an article of manufacture comprises a computer readable storage medium containing executable instructions adapted to cause a processing system to execute the above-described method of processing a digital radio broadcast signal.

BRIEF DESCRIPTION OF THE DRAWINGS

These and other features, aspects, and advantages of the present disclosure will become better understood with regard to the following description, appended claims, and accompanying drawings wherein:

FIG. 1 is a functional block diagram of an exemplary IBOC transmitter in accordance with certain embodiments;

FIG. 2 is a functional block diagram of an exemplary transmitter baseband processor in accordance with certain embodiments;

FIG. 3 is a functional block diagram of an exemplary IBOC receiver in accordance with certain embodiments;

FIG. 4 is a functional block diagram of a conventional exemplary receiver baseband processor;

DETAILED DESCRIPTION

Figure 5:
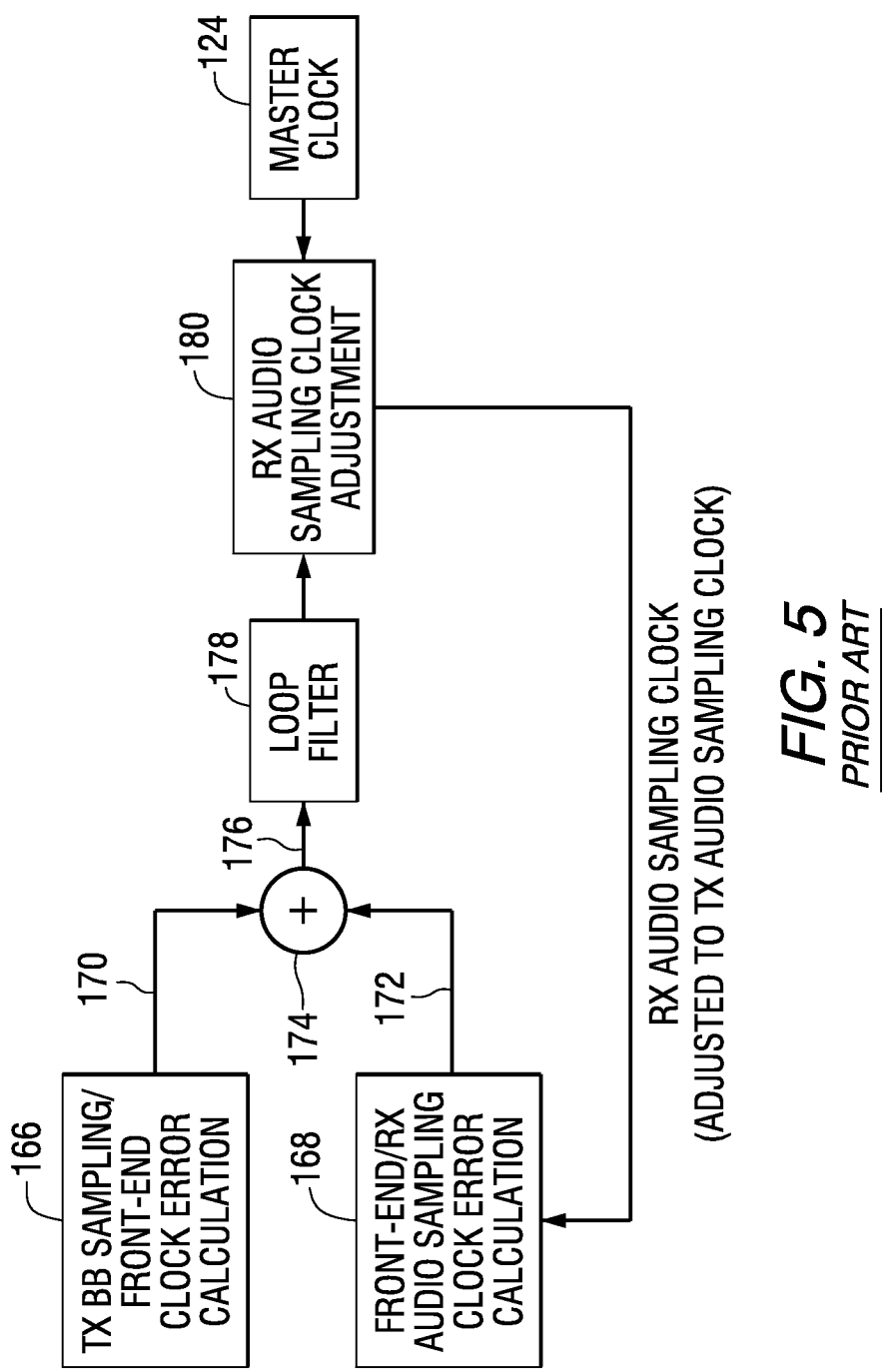
FIG. 5 is a functional block diagram of an exemplary conventional technique of adjusting a receiver audio sampling clock.

Embodiments described herein permit synchronous processing of the digital and analog components of a digital radio broadcast signal. While aspects of the disclosure are presented in the context of an exemplary IBOC system, it should be understood that the present disclosure is not limited to IBOC systems and that the teachings herein are applicable to other forms of digital radio broadcasting as well.

Throughout the specification, the terms "sampling", "sampling clock," "sampling period," and "sampling rate" will be used. Sampling refers to a process of converting an input signal into a corresponding sequence of samples that are spaced apart by predetermined amounts, e.g., uniformly in time. A sampling clock refers to a device or function, such as a local oscillator or software routine, that can provide a common reference train of electronic pulses for a digital sampling component. A sampling period refers to the period of time (typically of a fixed duration, for example) between samples of an input signal. The sampling period is governed by the sampling clock, and in instances where the sampling period is of fixed duration the sampling period will be an integer multiple of the sampling clock. The sampling rate is the reciprocal of the sampling period and refers to the number of samples taken in a period of time (e.g., a 22.7 μsec sampling period represents approximately 44,100 samples per second or 44.1 kHz).

Referring to the drawings, FIG. 1 is a block diagram of an exemplary digital radio broadcast transmitter 10 that broadcasts digital radio broadcasting signals. The exemplary digital radio broadcast transmitter may be a digital radio broadcast transmitter such as an AM or FM IBOC transmitter, for example. An input signal source 12 provides the signal to be transmitted. The source signal may take many forms, for example, an analog program signal that may represent voice or music and/or a digital information signal that may represent message data such as traffic information. A baseband processor 14 processes the source signal in accordance with various known signal processing techniques, such as source coding, interleaving and forward error correction, to produce in-phase and quadrature components of a complex baseband signal on lines 16 and 18, and to produce a transmitter baseband sampling clock signal on line 20. Digital-to-analog converter (DAC) 22 converts the baseband signals to an analog signal using the transmitter baseband sampling clock signal on line 20, and outputs the analog signal on line 24. The analog signal is shifted up in frequency and filtered by the up-converter block 26. This produces an analog signal at an intermediate frequency $f_{if}$ on line 28. An intermediate frequency filter 30 rejects alias frequencies to produce the intermediate frequency signal $f_{if}$ on line 32. A local oscillator 34 produces a signal $f_{lo}$ on line 36, which is mixed with the intermediate frequency signal on line 32 by mixer 38 to produce sum and difference signals on line 40. The unwanted intermodulation components and noise are rejected by image reject filter 42 to produce the modulated carrier signal $f_c$ on line 44. A high power amplifier (HPA) 46 then sends this signal to an antenna 48.

In one example, a basic unit of transmission of the digital radio broadcast signal is the modem frame, which is typically on the order of a second in duration. Exemplary AM and FM IBOC transmission systems arrange the digital audio and data in units of modem frames. In some embodiments, the systems are both simplified and enhanced by assigning a fixed number of audio frames to each modem frame. The audio frame period is the length of time required to render, e.g., play back audio for a user, the samples in an audio frame. For example, if an audio frame contains 1024 samples, and the sampling period is 22.7 μsec, then the audio frame period would be approximately 23.2 milliseconds. A scheduler determines the total number of bits allocated to the audio frames within each modem frame. The modem frame duration is advantageous because it may enable sufficiently long interleaving times to mitigate the effects of fading and short outages or noise bursts such as may be expected in a digital audio broadcasting system. Therefore the main digital audio signal can be processed in units of modem frames, and audio processing, error mitigation, and encoding strategies may be able to exploit this relatively large modem frame time without additional penalty.

In typical implementations, an audio encoder may be used to compress the audio samples into audio frames in a manner that is more efficient and robust for transmission and reception of the IBOC signal over the radio channel. The audio encoder encodes the audio frames using the bit allocation for each modem frame. The remaining bits in the modem frame are typically consumed by the multiplexed data and overhead. Any suitable audio encoder can initially produce the compressed audio frames such as an HDC encoder as developed by Coding Technologies of Dolby Laboratories, Inc., 999 Brannan Street, San Francisco, Calif. 94103-4938 USA; an Advanced Audio Coding (AAC) encoder; an MPEG-1 Audio Layer 3 (MP3) encoder; or a Windows Media Audio (WMA) encoder. Typical lossy audio encoding schemes, such as AAC, MP3, and WMA, utilize the modified discrete cosine transform (MDCT) for compressing audio data. MDCT based schemes typically compress audio samples in blocks of a fixed size. For example, in AAC encoding, the encoder may use a single MDCT block of length 1024 samples or 8 blocks of 128 samples. Accordingly, in implementations using an AAC coder, for example, each audio frame could be comprised of a single block of 1024 audio samples, and each modem frame could include 64 audio frames. In other typical implementations, each audio frame could be comprised of a single block of 2048 audio samples, and each modem frame could include 32 audio frames. Any other suitable combination of sample block sizes and audio frames per modem frame could be utilized.

An exemplary functional block diagram of a process for assembling a modem frame is illustrated in FIG. 2. The functions illustrated in FIG. 2 can be performed in the baseband processor 14 of FIG. 1, for example. An audio signal input 60, which may be digital or analog, is supplied on line 62. For analog audio signals, a digital audio interface 64 converts the analog audio into digital audio using a transmitter audio sampling clock 66 at the transmitter audio sampling rate. In typical implementations, the transmitter baseband sampling clock 20 can be synchronized with the transmitter audio sampling clock 66. For digital audio signals, the digital audio interface may up-sample or down-sample the input to match the transmitter audio sampling rate.

An audio encoder 68 (e.g., AAC, MP3, HDC, or WMA) scans the audio content of the audio information in the digital audio interface 64, which holds the audio information to be transmitted in the next modem frame. The scanning is done to estimate the complexity or "entropy" of the audio information for that modem frame. This entropy estimate can be used to project a desired number of bits required to deliver the desired audio quality. Using this entropy estimate, a scheduling algorithm can allocate the desired number of bits in the modem frame. An exemplary scheduling algorithm is described in U.S. Pat. No. 6,721,337.

After a number of bits have been allocated for the next modem frame, the audio encoder 68 encodes blocks of samples in all the audio frames (e.g., 64 audio frames) for the next modem frame and passes its result to the multiplexer (MUX) 70. The actual number of bits consumed by the audio frame is presented to the scheduling algorithm in the MUX so that it can make best use of the unused bit allocation, if any. The MUX receives audio frames from the audio encoder 68 and data from the data source 72 and outputs multiplexed audio frames and data to the modulator 74. The modulator 74 modulates the audio frames and any data packets into baseband samples for a modem frame and outputs the baseband samples on line 76 and the transmitter baseband sampling clock 20 on line 78.

The receiver performs the inverse of some of the functions described for the transmitter. FIG. 3 is a block diagram of an exemplary digital radio broadcast receiver 90. The exemplary digital radio broadcast receiver 90 may be a digital radio broadcast receiver such as an AM or FM IBOC receiver, for example. The digital radio broadcast signal is received on antenna 92. A bandpass preselect filter 94 passes the frequency band of interest, including the desired signal at frequency $f_c$, but rejects the image signal at $f_{c-2f_{if}}$ (for a low side lobe injection local oscillator). Low noise amplifier (LNA) 96 amplifies the signal. The amplified signal is mixed in mixer 98 with a local oscillator signal $f_{lo}$, supplied on line 100 by a tunable local oscillator 102. This creates sum $(f_c+f_{lo})$ and difference $(f_c-f_{lo})$ signals on line 104. Intermediate frequency filter 106 passes the intermediate frequency signal $f_{if}$ and attenuates frequencies outside of the bandwidth of the modulated signal of interest. An analog-to-digital converter (ADC) 108 operates using the front-end clock 110 to produce digital samples on line 112. Digital down converter 114 frequency shifts, filters and decimates the signal to produce lower sample rate in-phase and quadrature signals on lines 116 and 118. The digital down converter 114 also outputs a receiver baseband sampling clock signal on line 120. A baseband processor 122, operating using the master clock 124 that may or may not be generated from the same oscillator as the front-end clock 110, then provides additional signal processing. The baseband processor produces output audio samples on line 126 for output audio sink 128. The output audio sink may be any suitable device for rendering audio such as an audio-video receiver or car stereo system. In conventional systems the baseband processor can also provide an adjusted audio sampling clock signal on line 130 that is synchronized with the transmitter audio sampling clock signal 66 as described below.

An exemplary functional block diagram of a process for demodulating audio signals and data signals from a modem frame is illustrated in FIG. 4. The functions illustrated in FIG. 4 can be performed in the baseband processor 122 of FIG. 3, for example, which can comprise a processing system that may include one or more processing units (e.g., processors or other circuitry) configured (e.g., programmed with software and/or firmware) to perform the functionality described herein, wherein the processing system of the baseband processor can be suitably coupled to any suitable memory (e.g., RAM, Flash ROM, ROM). A demodulator 140 receives the baseband signal to be processed on line 142 and performs all the necessary operations of deinterleaving, code combining, FEC decoding, and error flagging of the audio and data information. The baseband signal is then passed to a demultiplexer (DEMUX) 144, which separates the audio signals and data signals. The data, if any, is outputted on a separate path from the audio to data output 146.

The audio information from each modem frame is processed by an audio decoder 148. The audio decoder 148 decodes the audio signals and outputs each audio frame of digital audio samples to a digital audio interface 150. The audio decoder 148 may include a function that is called every time the current audio frame of digital audio samples have been processed by the digital audio interface 150, which is a digital interface that can communicate with an output such as a car stereo system for rendering audio for a user and/or a digital processor that can store digital audio data. When the audio decoder 148 is called, it will typically output a single audio frame of audio samples, e.g., 1024 audio samples for an AAC decoder or 2048 audio samples for other typical decoders. In some embodiments a direct memory access (DMA) channel may be used to transfer audio frames of audio samples from the audio decoder 148 to the digital audio interface 150. Therefore, the DMA buffer can normally be programmed for blocks of fixed size such as 1024 or 2048 samples. In alternative embodiments, the output audio samples from the audio decoder can be copied under the control of a processing unit (e.g., in the baseband processor) to the digital audio interface 150. The digital audio interface 150 then outputs the audio samples to the output audio sink 128.

Referring back to FIG. 2, the audio encoder 68 of the transmitter can be driven by the transmitter audio sampling clock 66. As discussed above, the transmitter audio sampling clock 66 can be synchronized with the transmitter baseband sampling clock 20. However, the receiver baseband sampling clock differs from the transmitter baseband sampling clock because it is derived from the independent front-end clock 110. Thus the receiver baseband sampling rate can be adjusted to compensate for the difference between the transmitter baseband sampling clock and the receiver baseband sampling clock. Moreover, referring to FIGS. 3 and 4, the receiver baseband sampling clock 120, which is derived from the front-end clock 110, may not be synchronized with the receiver audio sampling clock 152, which may be derived from an independent master clock 124. The front-end clock 110 may be generated from the same oscillator as the master clock 154 or it may be generated from a different oscillator. Therefore the transmitter audio sampling clock and the receiver audio sampling clock are not synchronized.

Differences between the audio sampling clock rates mean that the transmitter audio sampling rate, which is driven by the transmitter audio sampling clock, may be different than the receiver audio sampling rate, which is driven by the receiver audio sampling clock. This difference in sampling rates may eventually result in overflowing or underflowing of the receiver's audio decoder buffers, which can cause distortions in the output audio signal. For example, assume that the transmitter sampling period is 22.7 μsec and the receiver sampling period is 22.8 μsec. In this case, the audio encoder will generate 227 samples in 5.1529 ms while the audio decoder will attempt to decode 227 samples in 5.1756 ms. Thus the audio decoder will fall behind the encoder, thereby resulting in buffer overflow. Over time, this difference could result in audio distortions. As a result, in order to properly decode the audio in the receiver (e.g., without generating audio distortions), the receiver audio sampling rate should be synchronized with the transmitter audio sampling rate. In conventional systems this is done by adjusting the receiver audio sampling clock 152 to match the transmitter audio sampling clock 66.

An exemplary functional block diagram of a conventional method of adjusting the receiver audio sampling clock is illustrated in FIG. 5. The conventional method is similar to a phase-locked loop (PLL) that calculates the phase error between the transmitter audio sampling clock and the receiver audio sampling clock and adjusts the receiver audio sampling clock accordingly. The functions illustrated in FIG. 5 may be performed in a baseband processor 122 of FIG. 3. A first error signal 170 between a transmitter baseband sampling clock and a receiver front-end clock is calculated by transmitter baseband sampling/front-end clock error calculation block 166. Block 166 may execute, for example, in a demodulator of the baseband processor. An exemplary technique of generating this error signal is described in commonly owned U.S. Pat. No. 7,733,983, which describes an exemplary symbol tracking algorithm for AM IBOC digital radio receivers. For FM transmission, the symbol tracking can be accomplished through observation of the phase drift from symbol to symbol over time or frequency (across subcarriers) using any suitable implementation approach, such as noted, for example, in U.S. Pat. No. 6,671,340. Additionally, a second error signal 172 between a receiver front-end clock and a receiver audio sampling clock 152 is calculated by front-end/receiver audio sampling clock error calculation block 168.

The first error signal 170 and second error signal 172 are summed by a phase error accumulator 174, which typically comprises an adder and a register with feedback from the register to the adder, thereby generating an output error signal 176 having the total error between the transmitter baseband sampling clock and the receiver audio sampling clock. Since the transmitter baseband sampling clock is synchronized with the transmitter audio sampling clock as previously described, this output error signal 176 represents the difference between the transmitter audio sampling clock and receiver audio sampling clock. This output error signal 176 is input into a low-pass loop filter 178, which minimizes abrupt changes in the receiver audio sampling clock. The filtered error signal is then output to a receiver audio sampling clock adjustment block 180, which operates similarly to a voltage controlled oscillator (VCO) in a typical PLL. To illustrate, assume that initially the receiver audio sampling clock is at nearly the same frequency as the transmitter audio sampling clock. Then, if the receiver audio sampling clock falls behind the transmitter audio sampling clock, the receiver audio sampling clock adjustment block 180 increases the clock speed of the receiver audio sampling clock. Likewise, if the receiver audio sampling clock creeps ahead of the transmitter audio sampling clock, the receiver audio sampling clock adjustment block 180 reduces the clock speed of the receiver audio sampling clock.

Audio sampling clock adjustment of the type illustrated in the conventional arrangement of FIG. 5 is possible only in receiver configurations wherein the receiver baseband processor is the master of the receiver audio sampling clock. If the receiver audio sampling clock is controlled by another component in the receiver, then the receiver baseband processor cannot adjust it. This may be the case, for example, in cellular phones and in automobile digital radio receivers that utilize a Media Oriented Systems Transport 50 (MOST50) network architecture. Therefore to minimize artifacts in the decoded digital audio signals, an alternative audio sampling rate adjustment scheme described in commonly owned U.S. Pat. No. 8,040,989, the disclosure of which is hereby incorporated by reference, may be used.

Figure 6:
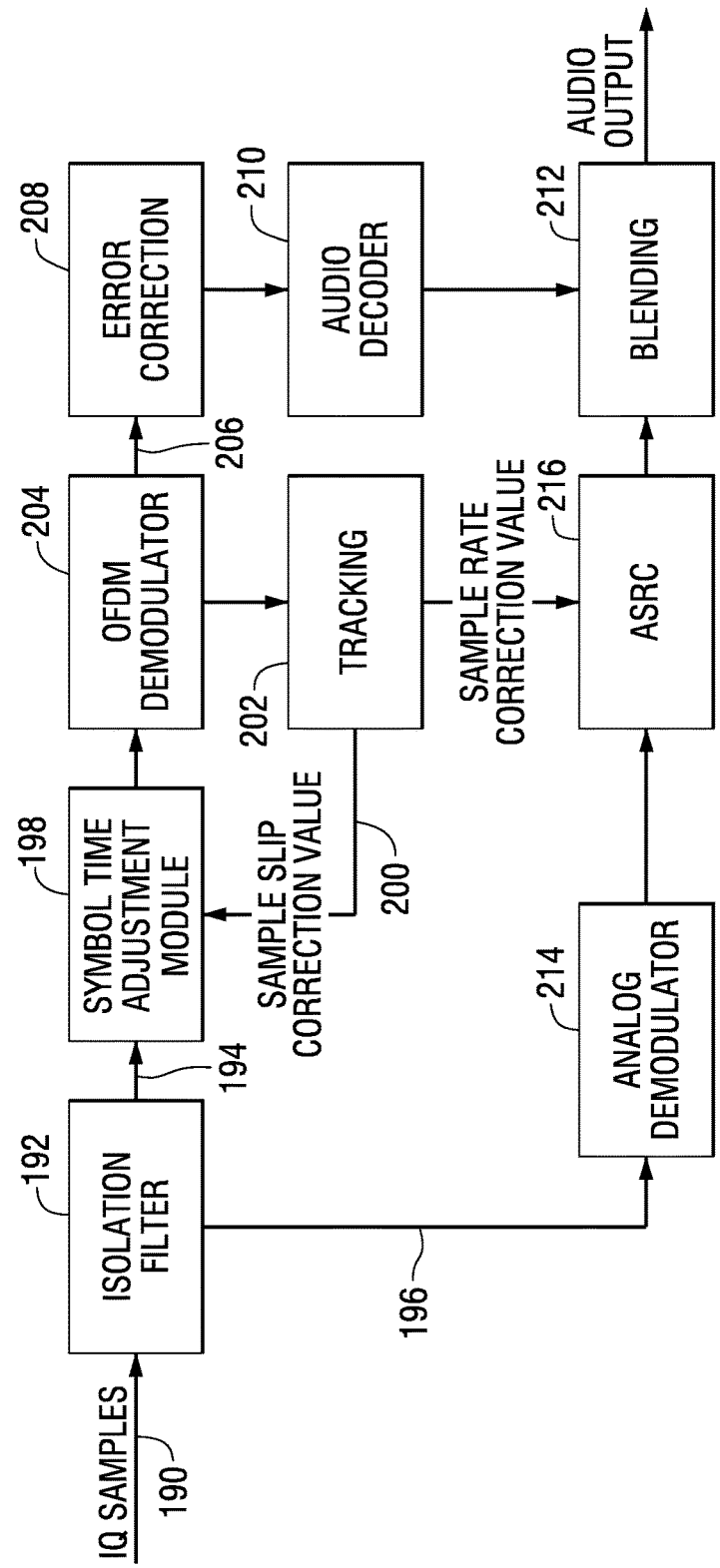
FIG. 6 is a functional block diagram of a conventional baseband processor.

FIG. 6 illustrates portions of the analog and digital pathways in an exemplary conventional baseband processor. IQ samples on line 190, which can be generated by a digital down-converter and include both the analog portion and digital portion of a baseband signal, enter an isolation filter 192, where the baseband signal is split into a digital signal pathway on line 194 and an analog signal pathway on line 196. Such filters are known to those of skill in the art. The baseband input sample frequency is typically 744.1875 kHz. This frequency is determined by the receiver's local clock. In the digital pathway, received OFDM symbols must be framed so that their boundaries are aligned with those of transmitted symbols. Discrepancies in symbol alignment may arise due to clock differences between the receiver and transmitter, which may result from clock oscillator instability. The symbol time adjustment module 198 corrects for the differences between the receiver clock and a transmitter clock. The adjustment is made based on sample slip correction value on line 200 received from a tracking module 202. The tracking module corresponds to box 166 of FIG. 5, wherein a first error signal 170 between a transmitter baseband sampling clock and a receiver front-end clock is calculated. Sample slip correction value is used by the symbol time adjustment module to advance or delay OFDM symbols by 1 sample depending on the sign of the slips. An adjusted symbol is then subjected to conventional OFDM demodulation in block 204. Simultaneously, the audio clock (not shown) is adjusted accordingly to prevent overflow or underflow of the audio buffers (not shown). The OFDM demodulator output on line 206 is subjected to error correction in block 208 and audio decoding in audio decoder 210 before being passed to a blending function 212.

In the analog pathway, an adjustment for differences between the receiver and transmitter clocks is not made prior to demodulation. Instead, samples are passed to an analog demodulator 214 and an asynchronous sample rate converter 216, so that the sampling rate of the demodulated audio signal in the analog path is adjusted according to the adjustments made to the audio clock. Based on sample rate correction value received from the tracking module, the ASRC (asynchronous sample rate converter) dynamically changes the sample rate conversion ratio. This also ensures that the sample rate of the audio samples at the output of the analog demodulator 214 is equal to the sample rate of the audio samples at the output of the audio decoder 210. This is necessary for the purpose of blending.

A disadvantage of the implementation shown in FIG. 6 is that digital and analog demodulation are performed asynchronously. As a result, in a software implementation, for example, the digital and analog demodulation processes are treated as different tasks using different software threads. Such an implementation requires task scheduling and context switching, which has an adverse impact on implementation complexity and MIPS (millions of instructions per second). In addition, this implementation complicates the time alignment between analog and digital audio for purposes of blending because it becomes difficult to maintain the same delay in the digital and analog audio processing pathways. For a discussion of blending, see U.S. Pat. Nos. 6,178,317, 6,590,944, 6,735,257, 6,901,242, and 7,546,088, the disclosures of which are incorporated by reference in their entirety.

To solve this problem the embodiments described below illustrate a new tracking scheme for estimating the sampling frequency discrepancy between the transmitter and the receiver, and compensate for the discrepancy by resampling the samples with the correct frequency (i.e., the baseband sample rate of the transmitter) using an asynchronous sample rate converter (ASRC).

Figure 7:
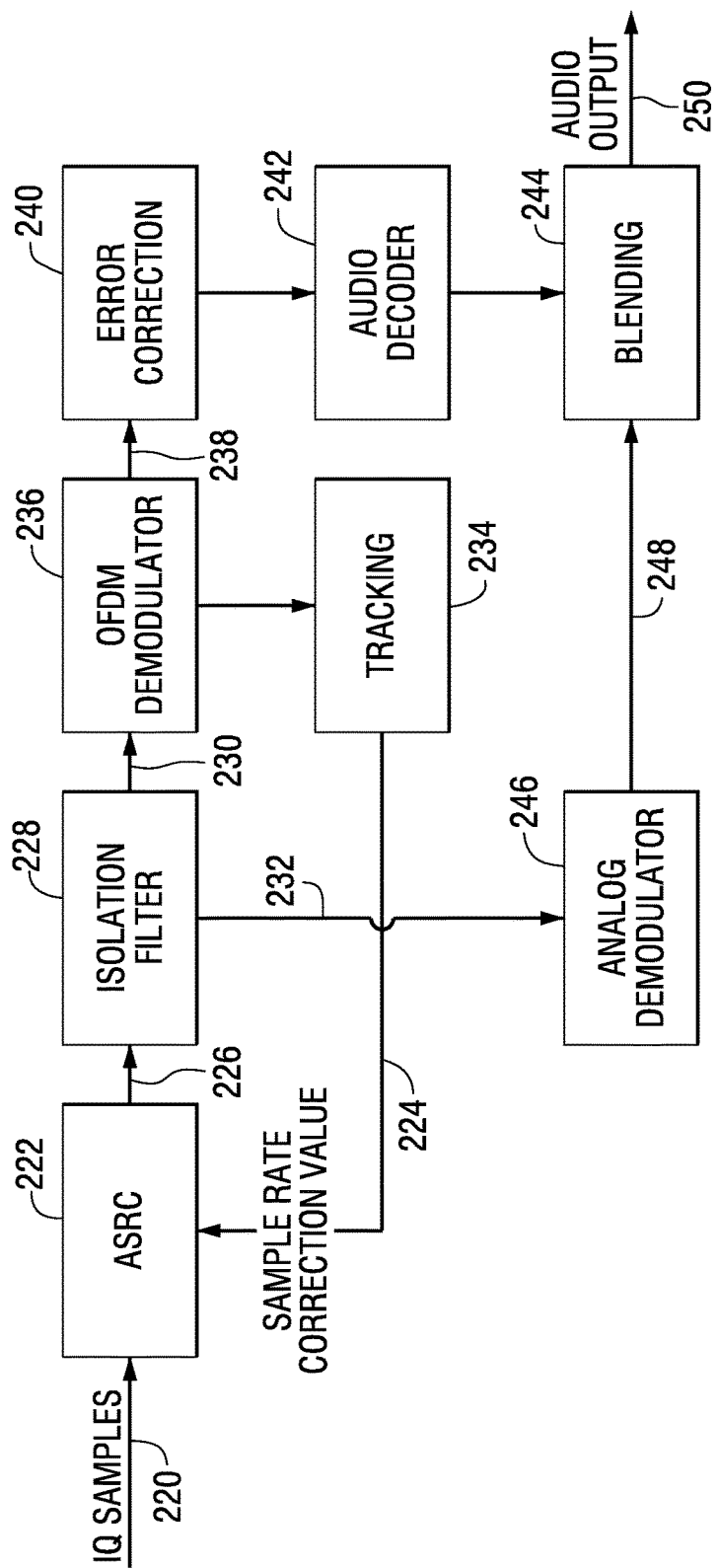
FIG. 7 is a functional block diagram of an exemplary baseband processor in accordance with an embodiment.

FIG. 7 illustrates portions of the analog and digital pathways in an exemplary embodiment of a baseband processor. The baseband processor shown in FIG. 7 allows the digital and analog demodulation to be performed synchronously.

IQ samples on line 220, which may be generated by a digital down-converter and include both the analog portion and digital portion of a baseband signal, enter an asynchronous sample rate converter (ASRC) 222. The asynchronous sample rate converter (ASRC) 222 adjusts the sample rate for the IQ samples in response to a sample rate correction value on line 224. The resulting adjusted samples on line 226 are passed to an isolation filter 228, where the baseband signal is split into a digital signal pathway on line 230 and an analog signal pathway on line 232. Such filters are known to those of skill in the art.

The asynchronous sample rate converter 222 corrects for the differences between the receiver clock and a transmitter clock. The adjustment is made based on sample rate correction value on line 224 received from a tracking module 234. The tracking module corresponds to box 166 of FIG. 5, wherein a first error signal 170 between a transmitter baseband sampling clock and a receiver front-end clock is calculated. An OFDM symbol containing samples with adjusted sample rate is then subjected to conventional OFDM demodulation in OFDM demodulator 236. Simultaneously, the audio clock (not shown) is adjusted accordingly to prevent overflow or underflow of the audio buffers (not shown). The OFDM demodulator output on line 238 is subjected to error correction in block 240 and audio decoding in audio decoder 242 before being passed to a blending function 244.

In the analog pathway, samples on line 232 are passed to an analog demodulator 246. The output of the analog demodulator on line 248 is passed to the blending function 244, where it is blended with the signal from the digital pathway to produce an audio output signal on line 250. In this scheme there is no need to use an ASRC at the output of the analog demodulator because the sample rate in the analog audio pathway has already been adjusted by module 222 based on the sample rate correction value received from the tracking module 234. Furthermore, since the sample rate adjustment is applied simultaneously to analog and digital pathways the processing in these pathways is synchronous. It simplifies the implementation including making it easier to time align analog and digital audio for the purpose of blending.

The sample rate correction value that is fed back to the ASRC can be determined, for example, by denoting a sample slip s(k), where k is the OFDM symbol index. Another variable, d(k), represents the additional sample slip that happened in the k-th OFDM symbol duration. That is, d(k) reflects the rate of change of the sample slip s(k), or the sample rate offset.

The relationship between s(k) and d(k) can be defined as:

$$s(k)=s(k-1)+d(k-1)+w_s(k), \quad (1)$$

where $w_s(k)$ is the zero mean random noise that captures the uncertainty in the dynamics of s(k). In one example s(k) and d(k) can be modeled as Gaussian random variables with mean value $$m(k) = \begin{bmatrix} m_s(k) \\ m_d(k) \end{bmatrix}$$

and covariance matrix $$C(k) = \begin{bmatrix} C_{ss}(k) & C_{sd}(k) \\ C_{sd}(k) & C_{dd}(k) \end{bmatrix}.$$

That is, $(s(k), d(k)) \sim N(m(k), C(k))$. Mean value m(k) will be an estimate for the sample slip and sample rate offset. The variance of $w_s(k)$ controls how fast the model can track the changes in s(k). It can be set to a value so that it can follow the fastest change that can happen in practical situations.

A common measurement of sample rate offset is ppm (parts per million). Equation (2) converts d(k) to the corresponding ppm value p(k):

$$p(k)=d(k)/L \cdot 10^6, \quad (2)$$

where L is the number of samples in one OFDM symbols.

The dynamics of d(k), can be modeled using a random walk model as in the following equation:

$$d(k)=d(k-1)+w_d(k), \quad (3)$$

where $w_d(k)$ is zero mean random noise. With this model d(k) is allowed to randomly drift, which matches a real world situation where the sample rate offset of the analog-to-digital converter (ADC) clock drifts with temperature and other factors. The variance of $w_d(k)$ controls how quickly the model can follow the drifting in real world. It can be set to a value so that it can follow the fastest drift that can happen in practical situations.

Equations (1) and (2) can be put into a matrix form as below.

$$\begin{bmatrix} s(k) \\ d(k) \end{bmatrix} = \begin{bmatrix} 1 & 1 \\ 0 & 1 \end{bmatrix} \begin{bmatrix} s(k-1) \\ d(k-1) \end{bmatrix} + \begin{bmatrix} w_s(k) \\ w_d(k) \end{bmatrix} \quad (4)$$

The random noise variables $w_s(k)$ and $w_d(k)$ are assumed to be zero mean Gaussian random variables. Denote $$w(k) = \begin{bmatrix} w_s(k) \\ w_d(k) \end{bmatrix}$$

and W(k) the covariance matrix of w(k), then w(k)~N(0,W(k)).

The observations used to estimate s(k) and d(k) are the raw sample slip estimate calculated from the reference subcarriers. Denote the observation y(k) to yield the following relationship:

$$y(k)=s(k)+v(k) \quad (5)$$

where v(k)~N(0,V(k)) is the random observation noise with variance V(k).

Equations (4) and (5) are the state space equations that model the sample slip and sample rate offset free of control input. They form the observer for the system states. A controller scheme will be presented next.

The purpose of the tracking loop is to drive both the sample slip s(k) and sample rate offset d(k) to zero and maintain them at zero. To achieve that goal, control devices and control signals are needed. There are two types of control devices available. One is a symbol time adjustment module, which can shift symbol boundary by an integer number of samples. The other one is a resampling device such as ASRC that can change the sample rate. The sample rate can be changed by adjusting the sample rate conversion ratio of the ASRC. Changing the sample rate, can not only synchronize the sampling rate between the transmitter and receiver, but can also gradually adjust and maintain correct the OFDM symbol boundary.

A state space model (with the control signal included) shows how the control signal can be applied in the tracking loop. Denote the sample slip control signal $u_s(k)$ and sample rate control signal $u_d(k)$. When $u_s(k)$ and $u_d(k)$ are integrated into equation (4), we have:

$$\begin{bmatrix} s(k) \\ d(k) \end{bmatrix} = \begin{bmatrix} 1 & 1 \\ 0 & 1 \end{bmatrix} \begin{bmatrix} s(k-1) \\ d(k-1) \end{bmatrix} + \begin{bmatrix} 1 & -1 \\ 0 & 1 \end{bmatrix} \begin{bmatrix} u_s(k-1) \\ u_d(k-1) \end{bmatrix} + \begin{bmatrix} w_s(k) \\ w_d(k) \end{bmatrix}. \quad (6)$$

State space equations (6) and (5) are the complete model for the full tracking loop with the control signal included.

As described below, the control signals $u_s(k)$ and $u_d(k)$ can be based on the estimates of s(k) and d(k).

While the described tracking algorithm may eliminate the need for a symbol time adjustment module, using a symbol time adjustment module for only a short period of time (as short as 100 symbols) at the initial phase of the tracking, can drive the sample slip toward zero much more quickly. And the use of symbol time adjustment module in the initial phase does not complicate the audio alignment between the analog and digital pathways because the digital audio is not yet available during the initial phase of tracking.

Figure 8:
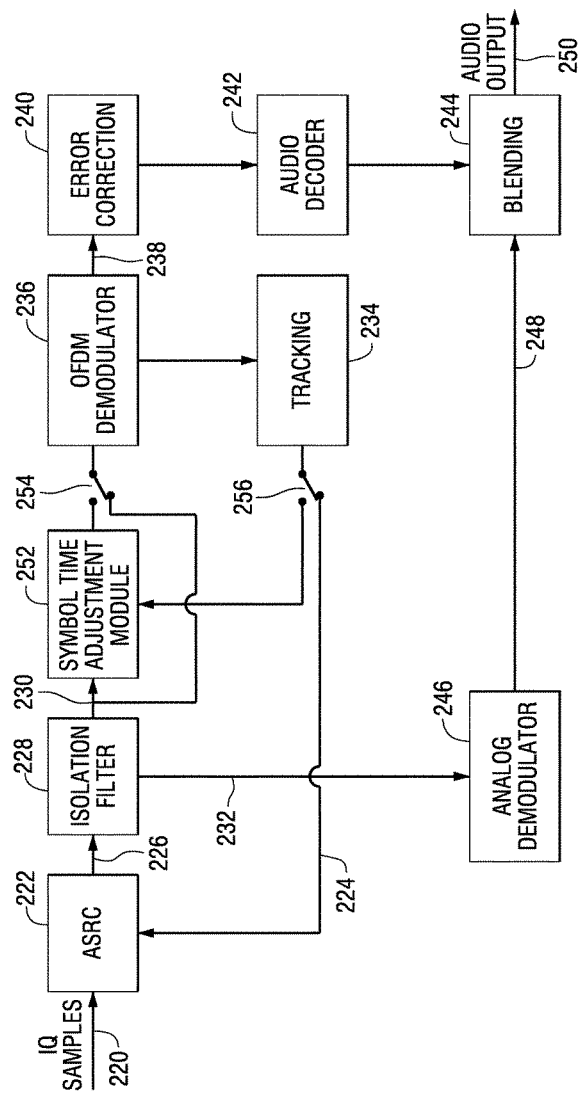
FIG. 8 is a functional block diagram of an exemplary baseband processor in accordance with another embodiment.

FIG. 8 is a functional block diagram of an exemplary baseband processor that includes a symbol time adjustment module. FIG. 8 includes the elements of FIG. 7, and further includes a symbol time adjustment module 252 and switches 254 and 256. In an initial phase of the symbol tracking process, switches 254 and 256 are closed in the upper position, thereby connecting the symbol time adjustment module between the isolation filter and the OFDM demodulator; and connecting the sample slip correction value from the tracking block to the symbol time adjustment module. Then for normal operation, the switches are closed in the lower position, thereby returning to the process described in FIG. 7. Note in the tracking module shown in FIG. 9 includes another switch 276 so in the initial phase the tracking module outputs sample slip correction value while in normal operation it outputs sample rate correction value.

The goal of the initial phase is to quickly drive sample slip s(k) to a close to zero value. To this end, a simple control scheme that adjusts the symbol time adjustment module can be used and it is not necessary to use $u_d(k)$ to control the ASRC. In one example, the control scheme adjusts one sample at a time using the symbol time adjustment module to compensate the sample slip until the sample slip is less than one sample. The mathematical form of this scheme is as follows.

$$u_s(k) = \begin{cases} 1 & \text{if } m_s(k) < -1 \\ -1 & \text{if } m_s(k) > 1 \\ 0 & \text{otherwise} \end{cases}$$

$$u_d(k) = 0$$

where $m_s(k)$ is the estimate of s(k). Note the use of symbol time adjustment module in the initial phase is optional. That is, only $u_d(k)$ can be used to control the ASRC from the very beginning. In this case it takes a little longer initially for the sample slip to be driven to zero.

Next an algorithm that uses only $u_d(k)$ as control signal is described. For convenience of presentation the notations in equations (6) and (5) can be simplified as follows $$x(k) = Ax(k-1) + Bu_d(k-1) + w(k) \quad (7)$$

$$y(k) = Fx(k) + v(k) \quad (8)$$

where $x(k) = \begin{bmatrix} s(k) \\ d(k) \end{bmatrix}$, $u(k) = \begin{bmatrix} u_s(k) \\ u_d(k) \end{bmatrix}$, $w(k) = \begin{bmatrix} w_s(k) \\ w_d(k) \end{bmatrix}$, $A = \begin{bmatrix} 1 & 1 \\ 0 & 1 \end{bmatrix}$, $B = \begin{bmatrix} -1 \\ 1 \end{bmatrix}$, and F=[1 0]. Note that in equation (7) the control variable $u_s(k)$ has been eliminated.

Various algorithms can be used to derive the control signal $u_d(k)$. In one example, a linear quadratic regulator (LQR) algorithm is suitable for the tracking loop. The reason is that it guarantees stability for this tracking loop and the loop response speed can be conveniently adjusted for a quick convergence.

For the state variables x(k) in equation (7), the LQR algorithm finds a control signal $$u_d(k)=-Kx(k) \quad (9)$$

that minimizes the following cost function $$h(k)=x(k)^T H x(k)+u_d(k)^T G u_d(k).$$

Through a tradeoff between response speed, settling time, and ringing (oscillation in steady state), we set $$H = \begin{bmatrix} 1 & 0 \\ 0 & 5 \cdot 10^7/540^2 \end{bmatrix}$$

and $G=100/540^2$. The solution of K is:

$$K=-(B^T PB+G)^T B^T PA$$

where P is the solution of the following equation $$P=A^T PA-A^T PB(B^T PB+G)^{-1} B^T PA+H.$$

Note K is computed beforehand and stored in memory, and is not calculated in real time.

With $$m(k) = \begin{bmatrix} m_s(k) \\ m_d(k) \end{bmatrix},$$

the estimate of x(k) the control rule used in the tracking loop is:

$$u_d(k)=-Km(k). \quad (10)$$

The algorithm for solving the state spaces equations (7) (8) to obtain m(k) is presented next.

It is worth pointing out that $u_d(k)$ is nonzero if either $m_s(k)$ or $m_d(k)$ is nonzero. This means $u_d(k)$ drives both sample slip s(k) and sample rate offset d(k) to zero.

To apply $u_d(k)$ as calculated in equation (10) to the resampling device we need to convert $u_d(k)$ to a form that is accepted by the resampling device, which is usually the sample rate conversion ratio.

Denote r the sample rate conversion ratio; $f_{in}$ and $f_{out}$ the input and output sample rate, respectively; and $$T_{in} = \frac{1}{f_{in}} \text{ and } T_{out} = \frac{1}{f_{out}}$$

as the input and output sampling interval, respectively. Then we have $$r(k) = \frac{f_{out}(k)}{f_{in}(k)}$$

$$= \frac{1}{\frac{T_{out}(k)}{T_{in}(k)}}$$

$$= \frac{1}{\frac{T_{out}(k-1) + \frac{u_d(k-1)T_{out}(k-1)}{L}}{T_{in}(k)}}$$

$$= \frac{1}{\frac{T_{out}(k-1)}{T_{in}(k)} + \frac{u_d(k-1)T_{out}(k-1)}{T_{in}(k)}}$$

$$\approx \frac{1}{\frac{T_{out}(k-1)}{T_{in}(k-1)}} - \frac{\frac{u_d(k-1)T_{out}(k-1)}{L}}{T_{in}(k-1)}$$

$$= r(k-1) - \frac{u_d(k-1)T_{out}(k-1)}{T_{in}(k) \cdot L}$$

$$= r(k-1)\left(1 - \frac{u_d(k-1)}{L}\right)$$

The approximation in the 5$^{th}$ step above is obtained by applying a Taylor series expansion and realizing that $$\frac{u_d(k-1)T_{out}}{L \cdot T_{in}(k)}$$

is very small.

State space equations (7) (8) are solved recursively in real time to estimate the sample slip and sample rate offset. The process of recursively solving the state space equations is also known as Kalman filtering.

To solve the equations the variances of the random noise W(k) and V(k) in the model are needed. Next we first present the standard solution assuming W(k) and V(k) are known and then we will modify the algorithm to deal with these unknowns. The steps are as follows.

$$a=Am(k-1)+Bu_d(k-1)$$

$$R=AC(k-1)A'+W(k-1)$$

$$f=Fa$$

$$Q=FRF'+V(k-1) \quad (11)$$

$$m(k)=a+RF'Q^{-1}(y(k)-f) \quad (12)$$

$$C(k)=R-RF'Q^{-1}FR' \quad (13)$$

where in, the initial conditions m(0), C(0) and V(0) are set for a quick convergence. In one example, set $$m(0) = \begin{bmatrix} 0 \\ 0 \end{bmatrix}, C(0) = \begin{bmatrix} 2 & 0 \\ 0 & 0.1 \end{bmatrix}, \text{ and } V(0) = 4.$$

The m(k) in (12) is the estimated value of $$x(k) = \begin{bmatrix} s(k) \\ d(k) \end{bmatrix}$$

at the k-th symbol. We can also regard {m(k)} as the filtered sequence of {x(k)}. The covariance matrix C(k) is updated in (13).

To deal with the unknown W(k) we adopt a known discount factor method. This method eliminates the need to estimate W(k) so computing complexity is reduced, while still achieving satisfactory performance.

Note in (11) W(k−1) has the effect of making R bigger. We can specify a discount factor $\delta \in [0,1]$ and change equation (11) into:

$$R = \frac{1}{\delta} A \cdot C(k-1) \cdot A'.$$

A smaller δ leads to less lag between the estimated value and the real value. But smaller δ also makes the estimated value less stable. In this tracking scheme δ is adjusted in real time as a function of previously estimated sample slip $m_s(k)$. If for any reason the sample slip is big or becoming big, the estimate should reflect it quickly so the control signal can respond quickly and drive the sample slip smaller. If the sample slip grows beyond the length of the cyclic prefix, the quality of the input to the tracking loop, which is the phase error phasor, will be degraded significantly and cause the loop to fail. When the sample slip is small, δ can be set to a larger value to have a more stable estimate of m(k) and consequently more stable control signal to the ASRC, which leads to better quality of the resampled OFDM samples.

Based on the above considerations, δ can be set according to the following formula.

$$i = \text{round}(\min(|m_s(k)|, 5))$$

$$\delta = \begin{cases} 1 - i*0.01 & i = 1, \dots, 5 \\ 0.999 & i = 0 \end{cases}.$$

The other unknown V(k), the variance of the observation noise, can be estimated as follows:

$$\tilde{e}^2 = Q^{-1}(y(k)-f)^2$$

$$V(k) = (1-\alpha)V(k-1) + \alpha \tilde{e}^2$$

where $\alpha \in (0,1]$ is a predefined value. A bigger α value leads to less lag between the estimated value and the real value. However bigger α a value also leads to less stable estimate. In one example, let $\alpha = \frac{1}{16}$.

Figure 9:
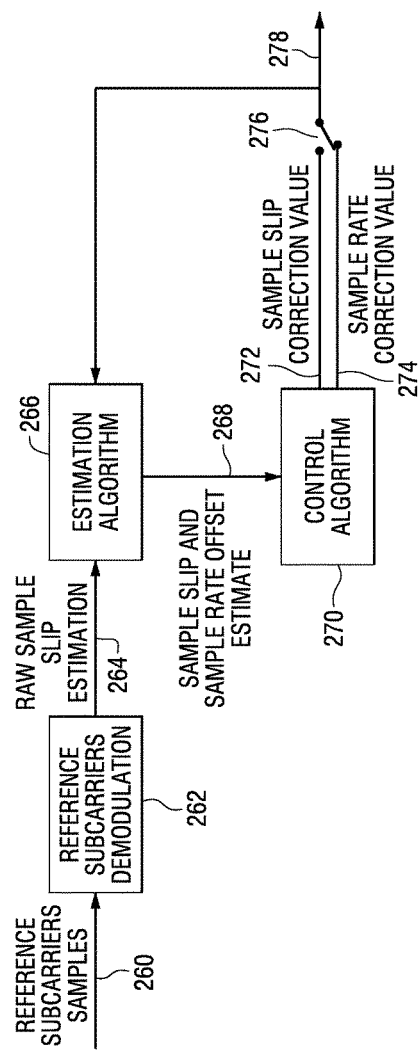
FIG. 9 is a functional block diagram of an exemplary tracking algorithm.

FIG. 9 is a functional block diagram of an exemplary tracking algorithm that may be implemented in the tracking block 234 of FIG. 8. In this example, samples of symbols transmitted on reference subcarriers are input on line 260. Examples of IBOC radio signals that include reference subcarriers are described in US Patent Nos. 7,305,043; 6,982,948; and 6,898,249, the disclosures of which are hereby incorporated by reference. Demodulation of the reference subcarriers in block 262 produces a raw sample slip estimation on line 264. An estimation algorithm in block 266 produces a sample slip and sample rate offset estimate on line 268. A control algorithm in block 270 produces a sample slip correction value on line 272 and a sample rate correction value on line 274. A switch 276 alternatively connects the sample slip correction value on line 272 and the sample rate correction value on line 274 to both an output 278 and the estimation algorithm block.

Figure 10:
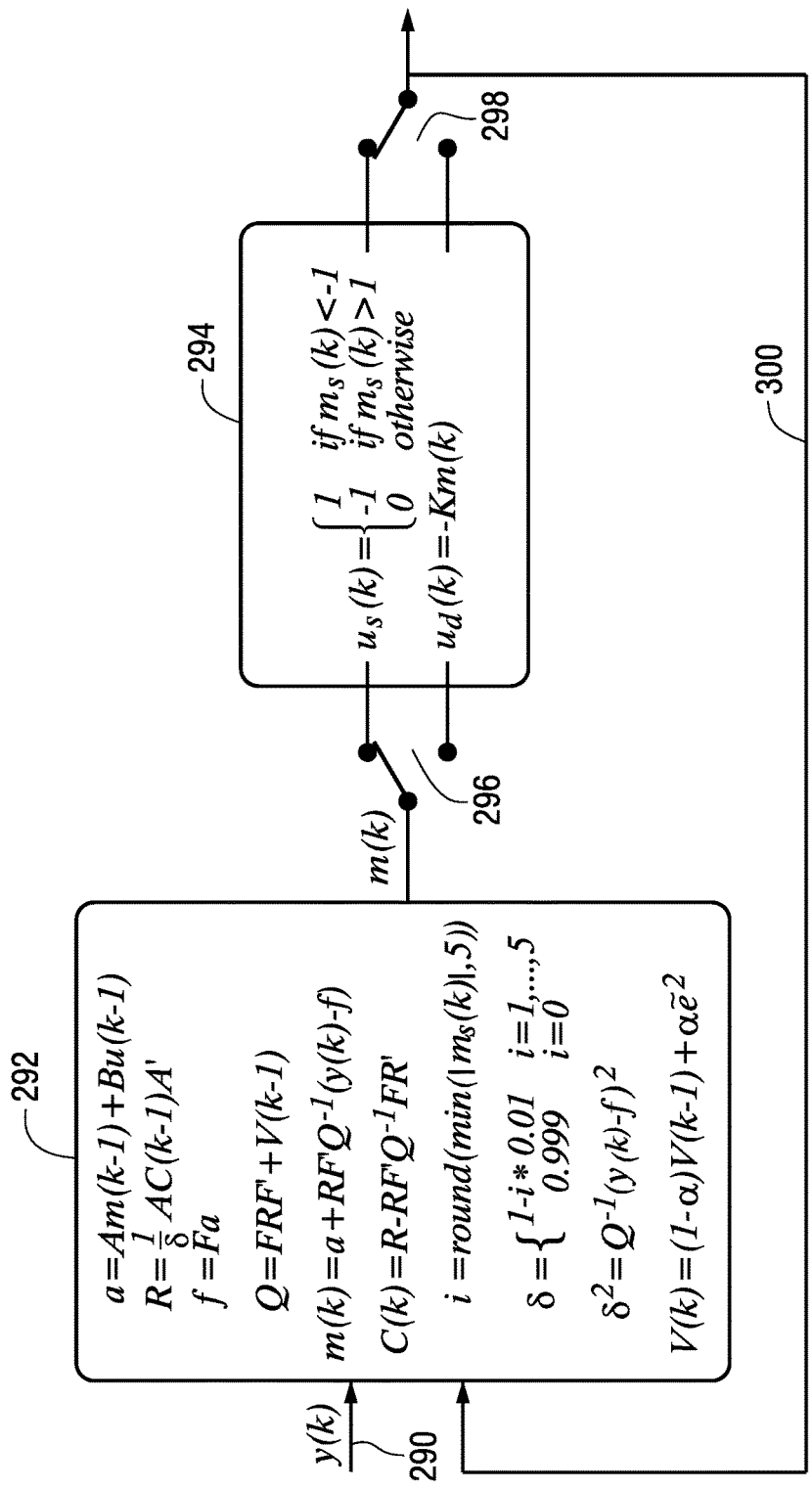
FIG. 10 is a functional block diagram of an exemplary estimation and control technique in accordance with certain embodiments.

FIG. 10 is a functional block diagram of an exemplary estimation and control technique that can be used in the tracking algorithm of FIG. 9. The observations y(k) from equation (5) are input on line 290. The observations are processed to estimate sample slip and sample rate offset using a Kalman filter according to the equations in block 292, wherein the equations in block 292 use the same notation as in the description above. For example, A, B, and F are pre-determined matrices from the model (7) and (8). C, m, and V are initialized to values shown in the document after equation (13). C, m, and V are then updated iteratively once each symbol using the equations above. Other variables in the estimation algorithm are intermediate variables whose status does not need to be carried from one iteration to the next. The sample slip and sample rate offset estimate m(k) is passed from the estimation algorithm to the control algorithm in block 294. The control algorithm has two paths that are selected using switches 296 and 298. In an initial phase of the symbol tracking process, switches 296 and 298 are closed in the upper position, so the sample slip estimation is passed to the control algorithm to determine a sample slip correction value to be used by the symbol time adjustment module. In normal operation switches 296 and 298 are closed in the lower position so the sample slip estimate and sample rate offset estimate are passed to the control algorithm to calculate a sample rate correction value to correct the sample rate conversion ratio of the ASRC.

In the control algorithm K is a pre-determined vector whose value is pre-calculated using the LQR algorithm. The output of the control algorithm is fed back to the estimation algorithm block on line 300.

In one embodiment, it is desired that the tracking loop stay locked even if the signal is lost for 1 minute. To meet this objective, the tracking loop needs to detect the loss of signal and then come back (return) of signal. This can be accomplished using a previously used signal-to-noise SNR tracking method. When the calculated SNR is lower than a first threshold, a signal loss is declared. When the calculated SNR grows above another threshold, a signal come back is declared.

After declaring the signal loss the control signal u(k) is set to zero and we stop solving the state space equations. Upon declaring signal come back the initial states of m(k) are set to zero, C(k) is reinitialized, and we restart solving the state space equations. This approach is better than keeping the model running after declaring signal loss. The reason is that with the new tracking algorithm, both sample slip s(k) and its rate of change d(k) have been kept to near zero before the signal is lost. And during signal loss, s(k) and d(k) should not have drifted away too much from zero.

On the contrary if we keep the model running after signal loss the loop state may drift to an erroneous state due to noise only input. If it drifts away too far then it will be difficult for the loop to converge again after the signal comes back.

In the described embodiments, IQ samples, generated by a digital down-converter and including both the analog portion and digital portion of a baseband signal, enter an asynchronous sample rate converter, which dynamically adjusts for differences between the receiver and transmitter clocks based on sample rate correction value received from a tracking module. Alternatively, an asynchronous sample rate converter might be implemented as part of the digital down-converter (block 114 in FIG. 3). Thereafter, the adjusted baseband signal enters an isolation filter, where the signal is split into a digital signal pathway and an analog signal pathway. Such filters are known to those of skill in the art. In the digital pathway, because the audio samples have already been adjusted, symbols can be assembled and provided directly to the OFDM demodulator. Thus, this implementation eliminates the need for a separate symbol time adjustment function. In addition, a phase equalizer module that would be required in the system of FIG. 6 and which is used to remove the phase rotation of the digital subcarriers caused by the timing adjustment module would no longer be necessary.

In the analog pathway, adjusted base-band samples are provided directly to the analog demodulator. The analog and digital processing pathways proceed synchronously, because the sample rate of the baseband signal was adjusted prior to its being split into digital and analog components. Thus, for software implementations, the analog and digital pathways may be processed one after the other without any need for scheduling, thereby reducing complexity and required MIPS.

The exemplary approaches described may be carried out using any suitable combinations of software, firmware and hardware and are not limited to any particular combinations of such. Computer program instructions for implementing the exemplary approaches described herein using any suitable processing system may be embodied on a computer-readable storage medium, the storage medium being a physical object, such as a magnetic disk or other magnetic memory, an optical disk (e.g., DVD) or other optical memory, RAM, ROM, or any other suitable memory such as Flash memory, memory cards, etc.

While the invention has been described in terms of several embodiments, it will be apparent to those skilled in the art that various changes can be made to the disclosed embodiments without departing from the scope of the invention as defined by the following claims. The embodiments described above and other embodiments are within the scope of the claims.

What is claimed is:

1. A method of processing a digital radio broadcast signal in a digital radio receiver comprising:
receiving baseband signal samples at a first sample rate;
using an asynchronous sample rate converter to adjust the sample rate of the baseband signal samples based on a sample rate correction value derived from both a sample slip and a sample rate offset between a receiver and a transmitter to produce adjusted baseband signal samples at a second sample rate to drive both the sample slip and the sample rate offset to zero;
filtering the adjusted baseband signal samples to separate a digital component of the samples and an analog component of the samples, wherein the digital component and the analog component are synchronous; and
separately demodulating the digital component and the analog component to produce a digital output signal and an analog output signal.

2. The method of claim 1, wherein the step of using an asynchronous sample rate converter to adjust the sample rate of the baseband signal samples further comprises:
resampling the baseband signal samples using the asynchronous sample rate converter.

3. The method of claim 1, further comprising:
using a Kalman filter to estimate the sample slip and the sample rate offset.

4. The method of claim 3, wherein a linear quadratic regulator (LQR) algorithm is used to determine the correction value.

5. The method of claim 1, wherein the step of filtering the adjusted baseband signal samples to separate a digital component of the samples and an analog component of the samples is implemented in an isolation filter.

6. The method of claim 1, further comprising:
using a symbol time adjustment module during an initial phase of tracking to drive the sample slip toward zero.

7. The method of claim 6, wherein:
the symbol time adjustment module adjusts samples of only the digital component.

8. The method of claim 1, further comprising:
detecting a loss of the digital radio broadcast signal;
stopping the step adjusting the sample rate of the baseband signal samples;
detecting a come back of the digital radio broadcast signal; and
restarting the step adjusting the sample rate of the baseband signal samples using a reset tracking algorithm.

9. A receiver for processing a digital radio broadcast signal, the receiver comprising;
a processing system including an asynchronous sample rate converter, an isolation filter, an OFDM demodulator, and an analog demodulator configured to receive baseband signal samples at a first sample rate; adjust the sample rate of the baseband signal samples based on a sample rate correction value derived from both a sample slip and a sample rate offset between a receiver and a transmitter to produce adjusted baseband signal samples at a second sample rate and to drive both the sample slip and the sample rate offset to zero; filter the adjusted baseband signal samples to separate a digital component of the samples and an analog component of the samples, wherein the digital component and the analog component are synchronous; and separately demodulate the digital component and the analog component to produce a digital output signal and an analog output signal.

10. The receiver of claim 9, wherein the processing system is further configured for adjusting the sample rate of the baseband signal samples including resampling the baseband signal samples.

11. The receiver of claim 10, wherein the processing system uses a Kalman filter to estimate the sample slip and the sample rate offset.

12. The receiver of claim 11, wherein the processing system uses a linear quadratic regulator (LQR) algorithm to determine the correction value.

13. The receiver of claim 9, wherein the processing system further comprises a symbol time adjustment module configured to drive the sample slip toward zero during an initial phase of tracking.

14. The receiver of claim 13, wherein the symbol time adjustment module adjusts samples of only the digital component.

15. An article of manufacture comprising a computer readable storage medium containing executable instructions adapted to a cause a processing system to execute the method of claim 1.

* * * * *